Sept. 21, 1965  M. J. ISLEY  3,207,247
MULTIPLE UNIT ENDLESS TRACK SUSPENSION SYSTEM
Filed Sept. 11, 1963  4 Sheets-Sheet 1

INVENTOR
Maynard J. Isley
BY Dale A. Winnie
ATTORNEY

Sept. 21, 1965   M. J. ISLEY   3,207,247
MULTIPLE UNIT ENDLESS TRACK SUSPENSION SYSTEM
Filed Sept. 11, 1963   4 Sheets-Sheet 2

INVENTOR
Maynard J. Isley
BY
Dale A. Winnie
ATTORNEY

Sept. 21, 1965 M. J. ISLEY 3,207,247
MULTIPLE UNIT ENDLESS TRACK SUSPENSION SYSTEM
Filed Sept. 11, 1963 4 Sheets-Sheet 3

INVENTOR
Maynard J. Isley
BY Dale A. Winnie
ATTORNEY

Sept. 21, 1965   M. J. ISLEY   3,207,247
MULTIPLE UNIT ENDLESS TRACK SUSPENSION SYSTEM
Filed Sept. 11, 1963   4 Sheets-Sheet 4

INVENTOR
Maynard J. Isley
BY Dale A. Winnie
ATTORNEY

United States Patent Office 3,207,247
Patented Sept. 21, 1965

3,207,247
MULTIPLE UNIT ENDLESS TRACK
SUSPENSION SYSTEM
Maynard J. Isley, 52690 Brooktrails Drive,
South Bend, Ind.
Filed Sept. 11, 1963, Ser. No. 308,281
12 Claims. (Cl. 180—9.58)

This invention relates to vehicle suspension systems in general and more particularly to a high displacement suspension system for use in vehicles required to travel over rough terrain at relatively high speeds.

Vehicles required to travel cross-country over rough and irregular terrain must have a large or high displacement suspension system. This is necessary to enable the vehicle to pass over obstructions without being caused to rock and sway from side to side and if the shock forces resulting from encountering obstacles in the course of travel are to be absorbed and a smoother and faster ride is to be obtained.

Military vehicles, in particular, must have a reasonably smooth ride if use is to be made of any heavy armament carried by the vehicle in the course of travel. Other types of cross-country vehicles must also provide a reasonably smooth ride where any use of the vehicle is required in the course of travel and where the comfort of the personnel carried in the vehicle is of importance.

In this latter respect, regarding the comfort of personnel carried in a military or other cross-country vehicle, it is obvious that the operational efficiency of the personnel carried is adversely affected by any discomfort and that a reasonably smooth ride is almost essential on this basis alone. Although a vehicle can be built to withstand almost any treatment and to take severe shock loads, unless a vehicle has a suspension system capable of absorbing and dissipating the shock forces occasioned on encountering obstacles in the course of cross-country travel, it can not be pushed to any reasonably high speeds without causing considerable fatigue and discomfort to those traveling in or on the vehicle and responsible for its operation or other duties in the course of travel or thereafter.

The force created by an obstruction in the path of a vehicle is essentially the product of the mass of the vehicle and the square of the velocity of the vehicle at the time of encountering an obstacle. Since the mass of the vehicle is determined by its intended purpose it is not changeable to any appreciable extent. It follows that a vehicle must travel at greatly reduced speeds if it is of any appreciable mass unless some means is provided to receive and dissipate these shock forces.

One way which has been recognized to absorb these impacts or shock forces is in the suspension system. A large force can obviously be dissipated easier over a large distance. Accordingly, a greater suspension travel will enable large and severe shock forces occasioned on encountering an obstacle in a vehicle's path to be more readily demised and a smoother ride to be obtained. This, in turn, will also enable higher speeds of travel to be obtained.

Previous efforts to produce a high or large displacement suspension system have been directed towards both hydropneumatic and mechanical systems. The hydropneumatic systems have considerable promise but include problems of cost, leakage, and the means or method of drive to be applied. The mechanical systems on the other hand do not include these problems and offer a more practical and immediate solution.

Accordingly, it is the object of this invention to provide a mechanical suspension system affording a large or high displacement to absorb and dissipate shock forces occasioned by a vehicle encountering irregular objects in traveling over rough and irregular terrain.

It is an object of this invention to provide a self-contained high displacement suspension unit including drive means and having a particular unique and meritorious suspension geometry.

It is also an object of this invention to provide means of stabilizing and controlling the suspension geometry of the high displacement system last mentioned to obtain the advantages of force dissipation previously discussed.

Another object of this invention is to provide a new, novel and different driving system while using relatively conventional drive components and parts.

With respect to the drive characteristics of the vehicle including the proposed suspension system, another object of this invention is to enable a vehicle to ride on regular wheels while still retaining track characteristics where floatation is required in softer terrain.

It is an object of this invention to provide a self-contained high displacement suspension and individual drive unit which may be used in pairs and tandem, with separate wheels or track, for different purposes and in all instances will provide fast, smooth, durable, stable and highly mobile means of locomotion.

With reference to the specific embodiment of this invention herein shown and described, it is an object of this invention to provide a multiple unit suspension system wherein each unit is self-contained and includes individual drive means. The separate units each have a relatively free floating suspension center, the drive wheels of each unit are supported on rearwardly disposed lever arms sprung by torsion bar means or the like. Forwardly disposed wheels of each unit are connected to the ends of the lever arms on separate pivotal arm or frame means and are in turn biased for ground engagement. The front and back wheels of each unit are accordingly pivotal about a common axis, through which a drive force may be supplied, while at the same time the forwardly disposed or front wheels have an exceptionally high displacement mobility in being primarily pivotal about the axis of the rear wheels and only therethrough confined to the pivotal axis of the unit as a whole. At the same time, the rearwardly disposed lever arm support affords a high displacement suspension support for the whole unit.

These and other objects and advantages to be gained in the practice of this invention will be better understood and appreciated upon a reading of the following specifications in regard to a preferred embodiment of the invention and having reference to the accompanying drawings wherein.

Figure 1:
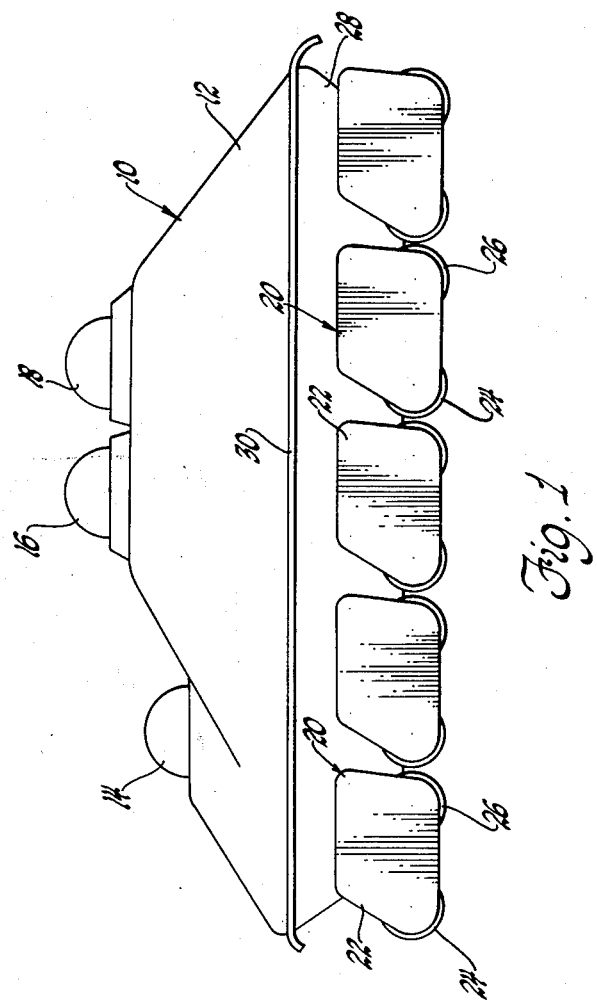
FIGURE 1 is a side view of a military vehicle, such as a tank, including the suspension units of this invention.
Figure 2:
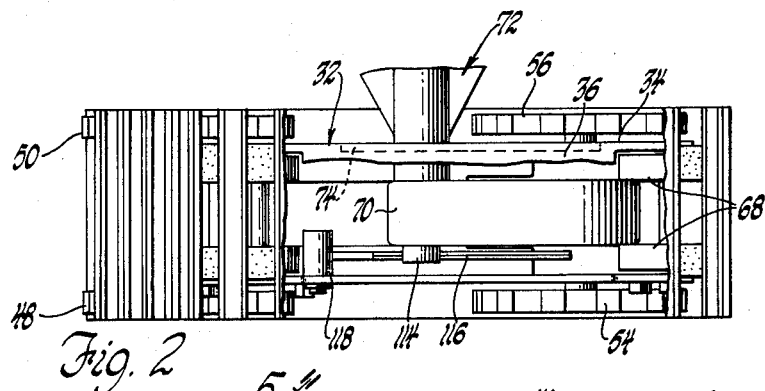
FIGURE 2 is a top plan view of one of the suspension units shown on the vehicle in FIGURE 1 with the shield removed and having parts broken away to better show certain features.

Referring to the different figures in greater detail:

A military type cross-country vehicle 10, is shown by FIGURE 1 and includes an armored body 12 having turrets 14, 16 and 18 for observation or armament and a supporting undercarriage made up of a plurality of separate and distinct high-displacement suspension units 20. On the vehicle 10 shown, there are five separate units on each side of the vehicle and each includes a cover plate 22. The units each include a forwardly and rearwardly disposed wheel 24 and 26 respectively.

As will be subsequently appreciated, each of the wheel supporting suspension units 20 is relatively narrow and is readily retained close to the underpart 28 of the vehicle body 12 and within the protection of the overhanging armor plate 30 along each side of the body.

Figure 3:
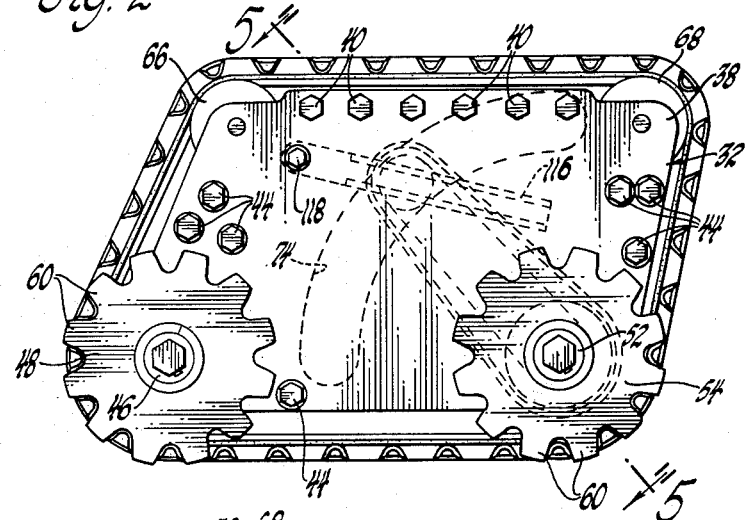
FIGURE 3 is a front side view of one of the suspension units shown on the vehicle in FIGURE 1, with the plate removed.
Figure 4:
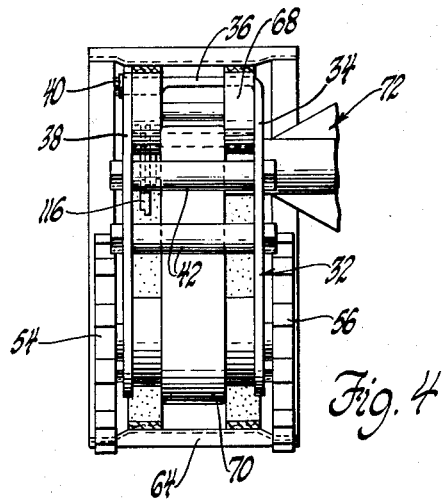
FIGURE 4 is an end view of the suspension unit shown by FIGURE 3, with the track removed.

Each of the suspension units 20 includes a bogie-like wheel carrying frame or cage 32 which has an outline form similar to a parallelogram. The frame member 32 actually includes a back wall member 34 having a right angle flange 36 along its upper disposed edge and which is engaged to a front wall member 38 by suitable bolt fastener means 40; reference being best made to FIGURES 3 and 4. Suitable spacers 42 are also provided between the front and back wall members near the front, back and bottom edges of the frame, a couple of which are shown in FIGURE 4. The general location of such spacers are best shown by the bolt fasteners 44 in FIGURE 3.

An axle shaft 46 is extended between the frame walls 34 and 38, near their front lower corners and supports a pair of wheels 48 and 50 thereon. Both wheels are keyed to the shaft, which rotates in suitable journal bearings in the supporting plates, and turn together. However, they may be separately rotatable on a fixed shaft if desirable for any reason.

Figure 5:
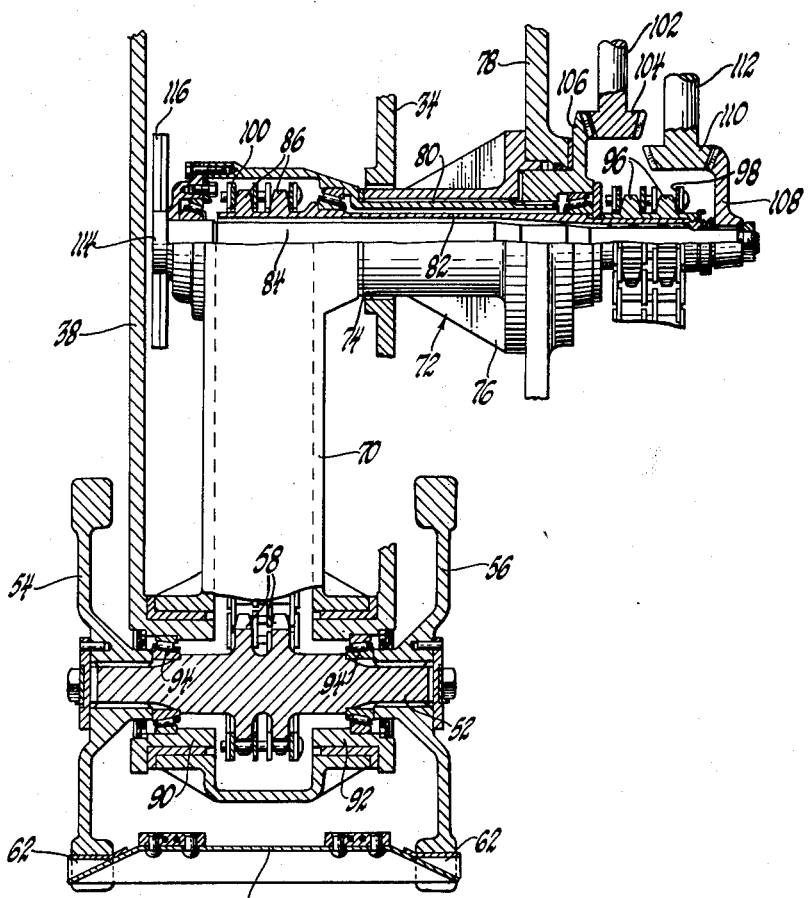
FIGURE 5 is an enlarged cross-sectioned view of the suspension unit of FIGURE 3 as seen in the plane of line 5—5 thereon and shows the drive system incorporated therewith.

A drive axle 52 is provided between the frame walls 34 and 38 near their back lower corners and includes wheels 54 and 56 keyed to opposite ends thereof. A drive gear 58 is provided on the axle shaft 52 between the frame walls, as best shown by FIGURE 5, and serves as a means for driving the wheels 54 and 56 as will later be described.

All four of the wheels 48, 50, 54 and 56 are formed to include sprocket teeth 60 which are receptive of sprocket pawls 62 on a floatation track 64 that extends peripherally around the whole suspension frame member 32, when used. However, the wheels are also individually receptive of a rubber tire formed to fit the sprocket wheels and which are not specifically identified but are shown in FIGURE 1.

The floatation track 64 is supported on parallel spaced rollers 66 and 68 provided at the upper forward and rearwardly disposed corners of the wheel carrying frame 32.

Although not shown, it will be appreciated that the armor cover plate 22, shown in FIGURE 1, is supported on the front frame wall member 34 by suitable supports. The plate is disposed to provide maximum protection for the track 64 and wheels against foreign objects or may even be made as a housing or cover rather than a face plate if considered necessary.

Each of the wheel carrying frames 32 are supported on the vehicle body 12 by lever arms 70 which are connected to the frame about the drive axle shaft 52 and extend inwardly and upwardly of the frame between the side walls thereof and are engaged with the drive and suspension support 72 which extends outwardly from the underpart 28 of the vehicle body and through an arcuate slot 74 formed in the back frame wall. The lever arm 70 provides a rearwardly and downwardly biased suspension support for the whole wheel carrier frame 32 and enables a relatively high displacement of the wheel carrying unit as will subsequently be more fully appreciated.

Referring now to FIGURE 5, the drive and suspension support 72 is shown to include a support housing 76 which is secured to the vehicle side wall 78 by bolt fasteners or the like not shown, and has the end thereof received in the arcuate slot 74 in the back wall of the carrier frame 32. Through this housing extends a tubular support 80, which is secured to and made a part of the lever arm 70, a tubular drive shaft 82 disposed concentrically in the support 80, and a torsion bar shaft 84 disposed concentrically inside both of the others.

The lever arm 70 is a hollow arm member and is formed so that its ends encompass drive gears 86 provided on the drive shaft 82 and the driven gears 58 on the axle shaft 52. The lower end of the lever arm is formed for journal engagement with suitable supports 90 and 92 formed from the frame walls 34 and 38 and is accordingly pivotal with respect thereto. The supports 90 and 92 bound the openings in the lower corners of the carrier frame 32 through which the axle shaft 52 extends and carries suitable roller bearings 94 for the support thereof.

Gear means 96 are provided on the inner end of the hollow drive shaft 82 and are engaged by a sprocket chain 98 which is connected to a drive power source, not shown. A sprocket chain 100 about the gears 86 on the other end of the drive shaft and about the gears 88 accordingly transfers drive power to the rearwardly disposed wheels 54 and 56. The gears and chain themselves are completely enclosed within the hollow lever arm member 70.

As mentioned previously, the upper end of the lever arm 70 is formed to include the tubular support 80 which extends through the support housing 76. Within the vehicle body there is provided a torsion bar 102 which is connected by a pair of bevel gears 104 and 106 or the like to the end of the lever arm supporting member 80. By means of the torsion bar 102 it is therefore possible to apply a suspension force on the lever arm 70 to support the vehicle off the ground and to provide a given amount of spring to the whole wheel carrier unit 32 through the lever arm engagement therewith.

At this point in the description of the disclosed embodiment of the invention it will be appreciated that the driven wheels 54 and 56 are supported on the rearwardly disposed lever arm 70 which is sprung by the torsion bar 102. However, without means other than the weight of the carrier frame 32 and wheels 48 and 50, which are mounted on the front end thereof, the carrier frame is rotatable about the drive axle 52 and there is no resistance to having the forwardly disposed carrier frame wheels bounced about every time an obstruction is encountered.

Referring once more to FIGURE 5, it will be noted that the torsion bar shaft 84, which extends through the tubular lever arm support shaft 80 and the tubular drive shaft 82, is connected through a pair of bevel gears 108 and 110 to a torsion bar 112 and that its outer end extends through the end of the lever arm 70 and is formed to have flat sides or otherwise includes a slide block lost motion connection 114 to which a connecting lever or link 116 is engaged. The latter is in turn pivotally connected by journal bearing means 118 to the carrier frame 32 forwardly of the arcuate slot 74, through which the lever arm connection to the vehicle body is made, and sufficiently over the front wheels 48 and 50 on the carrier frame 32 to bias them for ground engagement.

From the foregoing it will be appreciated that a secondary springing force may be applied through the torsion bar 112, via the lost motion connection and lever arm link 116, to the carrier frame to bias the front end of the carrier frame down to maintain ground engagement through the front wheels or for additional suspension support purposes. Actually, in practice, it is considered best to provide the suspension springing force through the rearwardly disposed lever arm 70 to the rear drive wheel and to merely provide the necessary ground holding force through the lost motion link 116.

Figure 6:
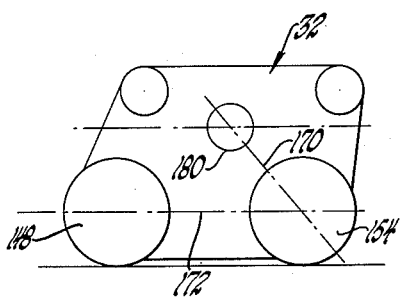
FIGURES 6-9 are schematic illustrations of the suspension unit showing several different attitudes that may be assumed thereby.

Referring now to FIGURES 6–9:

A simple schematic of one of the wheel carrier frames 32 is shown by FIGURE 6. The lever arm connecting line is identified 170, the forward and rearwardly disposed wheels are designated 148 and 154 and the forwardly disposed link or lever arm like provided by the frame between the two sets of wheels is designated by the line 172 between their respective centers. The suspension support connection between the wheel carrier frame and the vehicle body is identified as 180.

Figure 7:
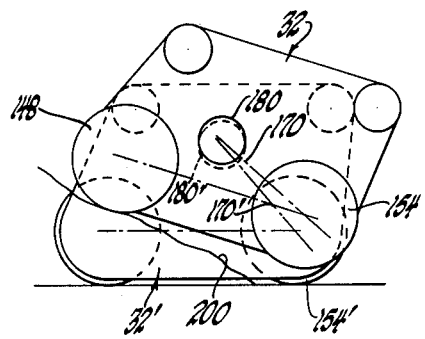
Figure 8:
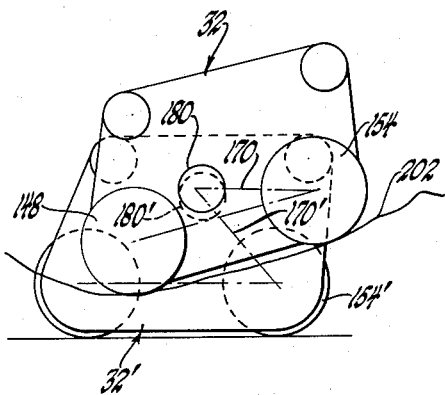
Figure 9:
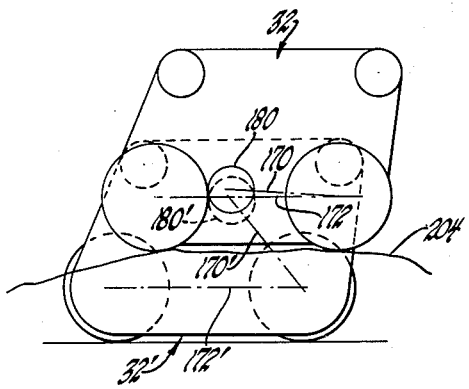

In the FIGURES 7–9 the corresponding wheel carrier frame on the opposite side of a vehicle body is shown and the corresponding parts last enumerated are given the same identification with a suffix mark for distinction. When a vehicle including the suspension units of this invention is traveling on level ground the different components of the wheel carrying unit on different sides of the vehicle are aligned. Such a situation is shown by FIGURE 6 where only the components of the closest wheel carrier unit are identified.

When the forwardly disposed wheel 148 of one of the suspension units encounters a shock incline, as shown by FIGURE 7, and identified as 200, the wheel lifts against the resistance of the torsion bar means biasing it for ground engagement (not shown) and causes the carrier frame to rotate about the axis of the wheel 154. This, in turn, winds up the torsion bar providing suspension support and, as a consequence of the counteracting torsion bar forces applied through the front link (not shown) and the trailing lever arm, will cause the rear wheel 154 to lift slightly and the suspension support connection 180 to raise and carry one side of the vehicle just slightly higher than on the other side where the other wheel unit is still travelling on a horizontal plane.

In the course of this movement of the suspension unit which has encountered the incline 200, the shock force of the encounter is dissipated in the torsion bar suspension system and the relatively high displacement afforded the unit enables this dissipation over a greater distance and without an appreciably great roll or tilting of the vehicle as the one unit travels over or begins up the incline. Furthermore, the lift of the rear wheels 154 in the course of the encounter takes the stress off the unsupported track section between the wheels, when used, and positions the rear wheel more favorably for its forthcoming encounter with the incline 200.

The situation is similar but slightly different when one of the wheel units is traveling on a horizontal plane and the other is travelling on a decline, as shown by FIGURE 8. The decline is identified 202. In this instance, the torsion bar providing suspension support is directly wound as shown by the change in position of the lever arm line 170 and by the higher disposition of the rear wheel 154. The ground holding force on the front of the carrier frame is relieved slightly by the lower disposition of the front wheel 148. There is a reactionary lifting of one side of the vehicle through the suspension support connection 180 but, as before, the large travel afforded the lever arm line 170 enables a considerable difference in the elevation of the two parallel suspension units while still maintaining a relatively level ride for the vehicle as a whole.

Full appreciation of the level ride characteristics afforded by the disclosed high displacement suspension system is best obtained by reference to FIGURE 9. Herein the higher elevation of one of the suspension units 32 in travelling on a plateau 204, as compared to the unit 32' on level ground, causes the lever arm line 170 to more closely approach alignment with the wheel connecting frame line 172. This places near maximum suspension stress in the system of the elevated unit but does not appreciably raise the suspension support connection 180.

From the preceeding discussion of the embodiment of this invention shown and described, it will be appreciated that the self-contained individual high displacement suspension units of this invention, both singularly and in multiple pairs, provide a unique and novel suspension system.

Each unit may and preferably does have its own separate drive which is shielded and protected from the elements and forceable damage.

The use of a separate drive means for the different units enables steering maneuverability through the braking and driving of selected units without adverse effects. It also affords maximum traction and drive power in that positive drive is provided to those wheels having ground engagement and is not affected by those which have lost traction.

When the lead end of one of the suspension units approaches a surface irregularity it pivots in an arc about the axis of the rear drive wheels. The after end of the unit, in turn, will pivot around the input drive axis in trailing arm fashion. This combination creates numerous suspension geometry possibilities.

The front end of each suspension unit is stabilized by a pivoted arm attached through a slide-box connection to a torsion member passing axially through the drive line. At the same time the trailing arm supporting tube is engaged to separate torsion bar means which provide support for the whole bogie frame unit.

It will also be appreciated that the use of separate torsion bar means for biasing the vehicle wheels at the front and back ends of the frame for ground engagement enables control over both the amount and distribution of the suspension support to be derived from either or both thereof. Similarly, in the use of multiple suspension support units the whole attitude of a vehicle, both fore and aft as well as side ways, may be set or varied to suit different load or terrain conditions by having certain of the units under more or less suspension supporting torsion force than others thereof.

Through the use of selective operational controls the torsion force to each unit may be varied even in transit just as the drive through the different units may be changed.

The drive means, through using relatively conventional parts, is particularly unique in using the same center as the suspension means and in that it is completely enclosed to the rear drive wheels. The drive wheels may, in turn, drive a track disposed slightly above their rolling radius so that floatation characteristics are obtained in soft terrain.

Although a preferred embodiment of this invention has been shown and described in detail, it will be appreciated that certain modifications and improvements are within the scope of the teachings set forth. Accordingly, such of these improvements and modifications as are within the spirit of the invention and are not specifically excluded by the language of the hereinafter appended claims, are to be considered as inclusive thereunder.

I claim:

1. A suspension unit, comprising:
   a wheel carrying bogie frame having a supporting lever arm pivotally connected to the after end thereof and extended centrally thereof,
   torsion bar means connecting said lever arm to a bogie frame carrying member and for biasing said arm downwardly for the suspension support of said member thereby,
   and means engaging and biasing the front end of said bogie frame downwardly for maintaining ground engagement therethrough.

2. The suspension unit of claim 1 including:
   said bogie frame having forward and after disposed wheels, and drive means provided concentrically of said torsion bar means and parallel said lever arm forward drive engagement with said after disposed wheels.

3. A suspension unit, comprising:
   a bogie frame having forwardly and rearwardly disposed wheels mounted thereon,
   said rearwardly disposed wheel including a drive axle,
   a lever arm member pivotal about said drive axle and extended centrally of said bogie frame, torsion bar means having the centrally disposed end of said lever arm engaged therewith and providing suspension support for said bogie frame therethrough, and drive means disposed concentrically of said torsion bar suspension support means and operatively connected to said drive axle without interference with said support means.

4. The suspension unit of claim 3 including:

separate torsion bar means disposed concentrically of said first mentioned torsion bar means and operatively engaged with the forward end of said bogie frame for ground engaging biasing thereof.

5. A suspension system, comprising:

multiple suspension support units cooperatively disposed in parallel on opposite sides of a vehicle body and in tandem on the same sides thereof, said units each including a wheel carrying bogie frame and a downwardly biased and bogie supporting trailing arm connected to the after ends thereof, separate means concentrically disposed and biasing opposite ends of each of said units for ground engagement through the wheels carried thereby, and separate drive means provided through each of said trailing arm connections and operatively engaged to wheels carried by said bogie frames.

6. A vehicle supporting suspension unit, comprising:

a frame member including front and back side walls secured together in parallel spaced relation, vehicle wheels and supporting axles provided between said frame side walls near the lower disposed front and back edges thereof, suitable guide rollers provided on said frame member and a floatation track disposed peripherally about said frame member and engaged with said guide rollers and vehicle wheels, an arcuate slot provided in said back frame wall concentric with the after disposed of said wheel supporting axles, a suspension supporting trailing arm connection provided through said arcuate slot and pivotal about said after disposed axle, torsion bar means engaging and biasing said trailing arm connection downwardly for the support of a vehicle at least in part on the after disposed of said vehicle wheels, separate means biasing the forwardly disposed end of said frame member downwardly for ground engagement of the forwardly disposed of said vehicle wheels, and drive means having a drive line connection to the after disposed of said vehicle wheels via said suspension supporting trailing arm connection.

7. The vehicle supporting suspension unit of claim 6, said suspension supporting trailing arm connection comprising a tubular support receptive through the side wall of a vehicle body and disposed horizontally, a vehicle weight supporting lever arm member secured to the outer disposed end of said tubular support, extended laterally and journalled about said after disposed axle, and said torsion bar means including a torsion bar member disposed transversely of said tubular support and operatively connected to the inner end thereof for applying a yieldable turning force to said tubular support and a suspension springing force to said lever arm.

8. The vehicle supporting suspension unit of claim 7, said drive means including a drive shaft member disposed concentrically within said tubular support, chain drive means connecting said drive shaft to said after disposed vehicle wheel axle, and said lever arm member being formed as a housing enclosing said chain drive means there within.

9. The vehicle supporting suspension unit of claim 7, said separate means biasing the forwardly disposed end of said frame member downwardly including separate torsion bar means disposed concentrically within said tubular support, a lost motion connection provided on the extended end of said separate torsion bar means, and a connecting link between said lost motion connection and the forwardly disposed end of said frame member.

10. The vehicle supporting suspension unit of claim 6, said suspension supporting trailing arm connection, means biasing the forwardly disposed end of said frame member downwardly, and said drive means being at least in part disposed in non-interferring spaced and concentric relation each relative to the other.

11. The vehicle supporting suspension unit of claim 10, said drive means including a tubular drive shaft disposed in spaced concentric relation between said suspension supporting trailing arm connection and said forward frame end biasing means.

12. A suspension unit, comprising:

a rearwardly disposed lever arm having a vehicle supporting first wheel provided thereon, means biasing said lever arm for ground engagement and suspension support through said wheel, a forwardly disposed lever arm pivotally engaged to and solely supported by said rearwardly disposed lever arm and having a vehicle supporting second wheel provided thereon, means biasing said last mentioned lever arm for ground engagement through the second mentioned wheel thereon, said forwardly disposed lever arm being longer than said rearwardly disposed lever arm and receptive of the latter substantially in the plane thereof, and concentrically disposed torsion bar means operatively and separately engaged with said lever arms for the biasing thereof as aforesaid.

References Cited by the Examiner

UNITED STATES PATENTS

| | | | |
|---|---|---|---|
| 1,241,034 | 9/17 | Search | 180—9.58 |
| 2,894,592 | 7/59 | Ordorica | 280—124 X |
| 3,047,283 | 7/62 | Kivell | 280—124 X |
| 3,168,929 | 2/65 | Wardle | 180—9.54 |

FOREIGN PATENTS 529,739  11/40  Great Britain.

BENJAMIN HERSH, *Primary Examiner.*

ARTHUR L. LA POINT, *Examiner.*